UNITED STATES PATENT OFFICE.

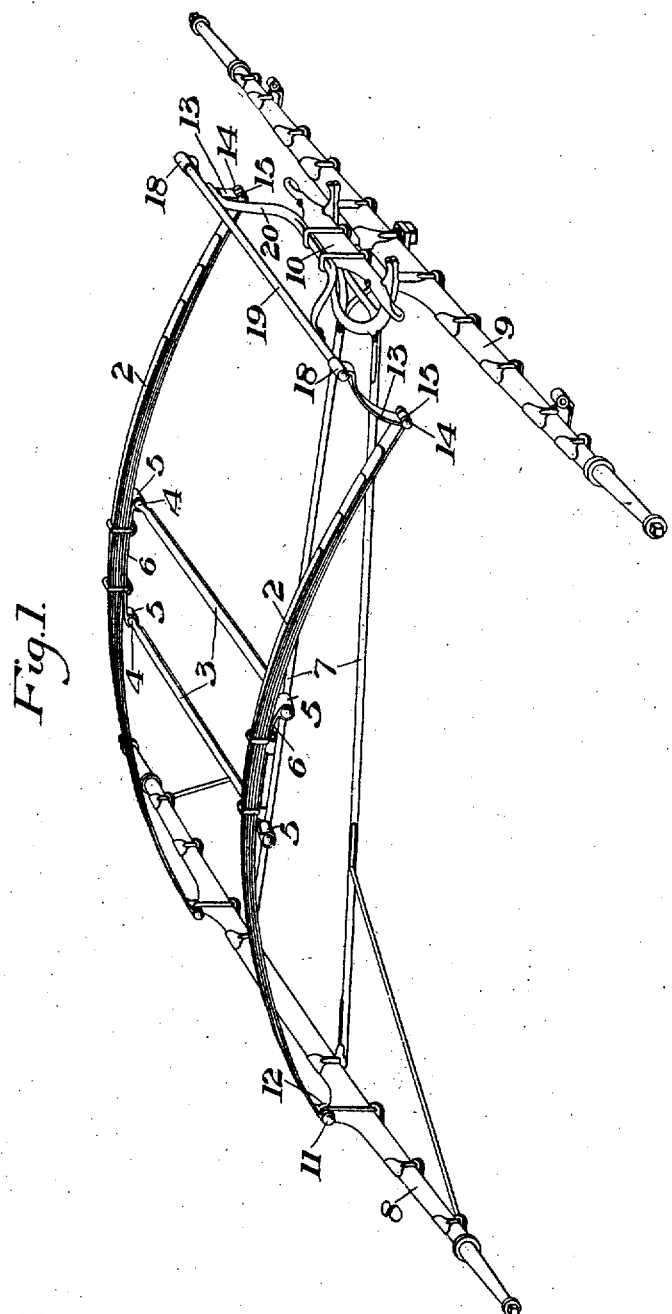

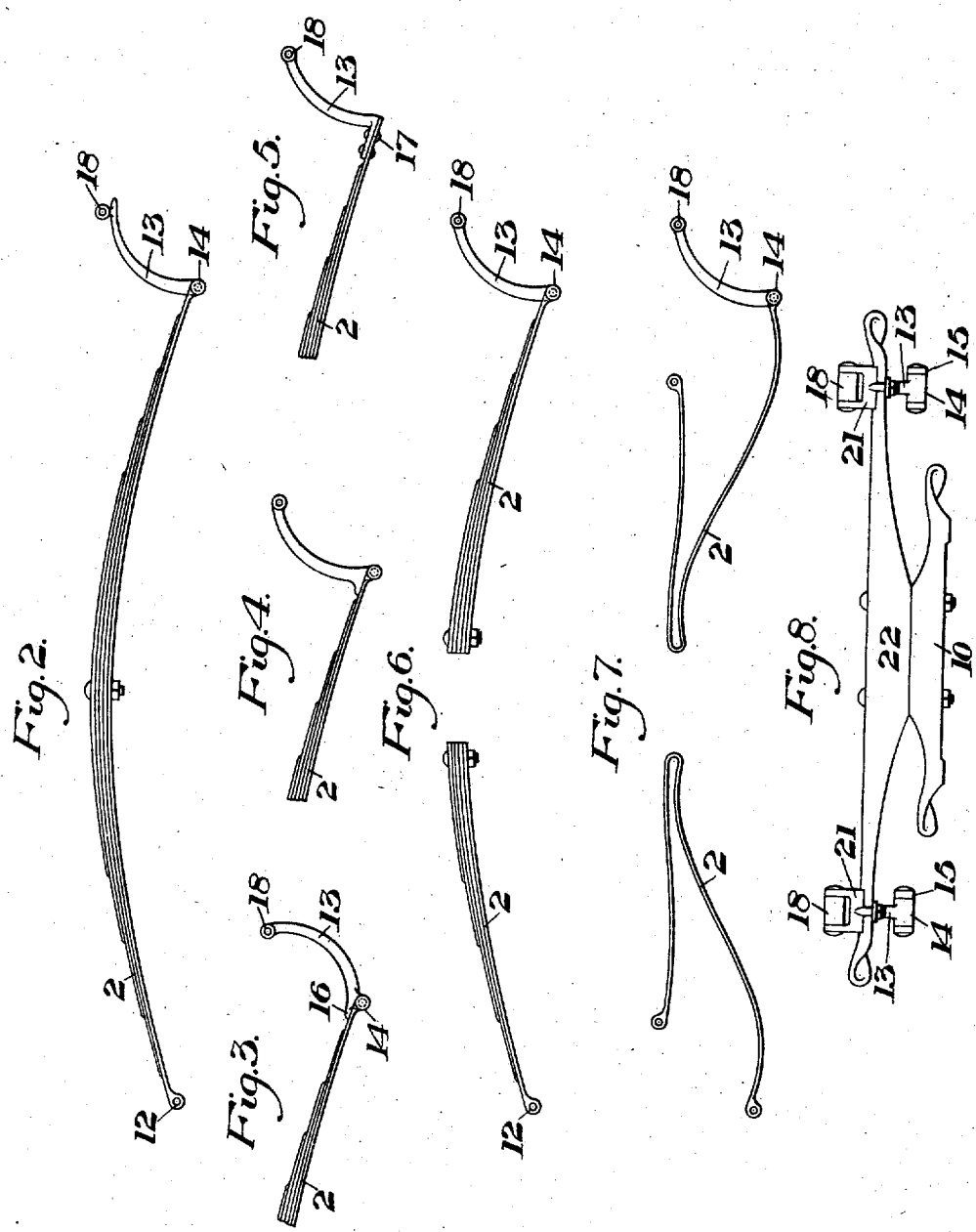

CHARLES A. BEHLEN, OF DURHAM, NORTH CAROLINA, ASSIGNOR TO DURHAM BUGGY COMPANY, OF DURHAM, NORTH CAROLINA, A CORPORATION OF NORTH CAROLINA.

SIDE-SPRING VEHICLE-GEAR.

No. 883,686.   Specification of Letters Patent.   Patented April 7, 1908.

Application filed September 3, 1907. Serial No. 391,011.

*To all whom it may concern:*

Be it known that I, CHARLES A. BEHLEN, of Durham, Durham county, North Carolina, have invented a new and useful Side-Spring Vehicle-Gear, of which the following is a full, clear, and exact description, reference being had to the accompanying drawings, forming part of this specification, in which—

Figure 1 is a perspective view of a vehicle gear embodying my invention; Figs. 2, 3, 4 and 5 are detail views showing different forms of the connecting arm; Figs. 6 and 7 are detail views showing modified forms of the side springs; and Fig. 8 is an end view showing a modified form of the elevator bar.

My invention has relation to side spring vehicle gears of that class in which reach connections are employed, and is designed to provide a gear of this character having means for keeping the gear in track, and which will obviate the use of swinging or sliding couplings, and equalizers; also to provide means for preventing the reaches from bowing, when the springs are in action.

The precise nature of my invention will be best understood by reference to the accompanying drawings, it being premised, however, that various changes may be made in the details thereof by those skilled in the art without departing from my invention, as defined in the claims.

In these drawings, 2 designates the side springs which may be of any usual or suitable form. In Figs. 1 to 5 inclusive, I have shown them as being of the usual continuous laminated form; in Fig. 6 these springs are also shown as of laminated forms, but divided each into two sections. Fig. 7 illustrates a compound form of spring of well known type.

3 designates transverse rods or bars whose shouldered ends 4 are engaged with eyes 5 at the ends of straps 6 which are clipped or otherwise secured to the central portions of the springs 2, and which serve to hold the gear in square.

7 designates reach rods; 8 designates the rear axle, and 9 the front axle.

10 is the bolster.

The rear ends of the side springs are connected to the rear axle 8 by means of pins 11 extending through eyes or heads 12 on the ends of the springs which journal in the shackles clipped, or otherwise secured, to the axle. The front end of each spring has connected thereto an upwardly and forwardly-extending arm 13. In the form shown in Figs. 1 and 2, this arm has an eye 14 at its lower end which is closely fitted in an open head 15 on the end of the spring in a manner to prevent backward movement of said arm beyond the position shown. Fig. 3 shows this arm in a reverse position and secured in the same manner as in Fig. 2, but with a projecting lug or shoulder 16 which engages the top of the spring and firmly braces the arm against backward movement. Fig. 4 shows the arm attached in the same manner as in Fig. 3, but with the arm in the position shown in Fig. 2. In Fig. 5, the arm is rigidly connected to the end of the spring by the rivets 17. The free upper ends of the arms 13 are formed with eyes 18 which journal on an elevator bar or rod 19 which is supported on the bolster 10 by a metal yoke 20.

In the modification shown in Fig. 8, the eyes 18 are journaled in shackles 21 which are clipped or otherwise secured to the ends of a wooden elevator bar 22 which is bolted or otherwise secured to the bolster 10.

By reference to Fig. 2, it will be seen that the front end of the springs are, by reason of the arms 13, connected at points considerably higher than the rear ends of said springs, the elevator bar being preferably raised to such an extent, that the eyes 18 will be substantially in the plane of the top of the central portions of the side springs. By reason of this manner of connecting the springs at their front ends, it will be seen that when the springs are in action, the tendency is for their rear arms to become longer, while the front arms shorten that is to say, the distance between the center of the side spring and the rear axle becomes relatively greater than the distance between the center of the side spring and the front axle. This results in an equalizing action which relieves the gear from strain, especially at the points where the arms 13 are connected to the elevator bar, and also effectively prevents any bowing of the reach rods.

While I have shown and described the use of the connecting arms as being preferably at the front end of the gear, they may, if preferred, be used at the rear ends of the side springs. It will also be understood that the invention is applicable to various forms of side spring gears.

What I claim is:—

1. In a side spring vehicle gear, a side spring having a connecting arm at one of its ends rigidly connected thereto against movement in one direction, but free to move in the other direction, and journaled at its free end to the gear above one of the axles; substantially as described.

2. In a side spring vehicle gear, a side spring having one of its ends connected to the running gear at a point below the top of the central portion of the spring, and its other end connected to the running gear at a point substantially in the plane of the top of the central portion of the spring the connection between the spring and the running gear being formed by a member which is rigidly connected to the spring against movement in one direction, but is free to move in the opposite direction; substantially as described.

3. In a side spring vehicle gear, a side spring, a connecting arm attached to the forward end of said spring and free to move forwardly but rigid in so far as backward movement is concerned, and an elevator bar to which said arm is journaled at its upper end; substantially as described.

In testimony whereof, I have hereunto set my hand.

CHARLES A. BEHLEN.

Witnesses:
W. T. MINOR,
JOHN I. ROSE.